United States Patent [19]
Rothbühr et al.

[11] 3,852,399
[45] Dec. 3, 1974

[54] PROCESS FOR THE PRODUCTION OF CARBON BLACK BEADS

[75] Inventors: Lothar Rothbühr; Walter Fritz, both of Hermulheim, Germany

[73] Assignee: Deutsche Gold- und Silber-Scheideanstalt vormals Roessler, Frankfurt(Main), Germany

[22] Filed: Sept. 6, 1972

[21] Appl. No.: 286,749

[30] Foreign Application Priority Data
Sept. 23, 1971 Germany............................ 2147503

[52] U.S. Cl. .................................. 264/117, 23/314
[51] Int. Cl. ............................................ B01j 2/10
[58] Field of Search ........ 264/117; 23/314; 425/222

[56] References Cited
UNITED STATES PATENTS
3,461,487   8/1969   Miller .............................. 425/222

Primary Examiner—Robert F. White
Assistant Examiner—J. R. Hall
Attorney, Agent, or Firm—Cushman, Darby & Cushman

[57] ABSTRACT

A process for making carbon black pellets of high bulk density and improved mechanical properties as well as having reduced need for pelletizing liquid is obtained by leading the mixture of carbon black and pelletizing fluid from below upwardly through a pelletizing apparatus provided with a substantially vertical shaft or screw having pins attached thereto.

4 Claims, 4 Drawing Figures

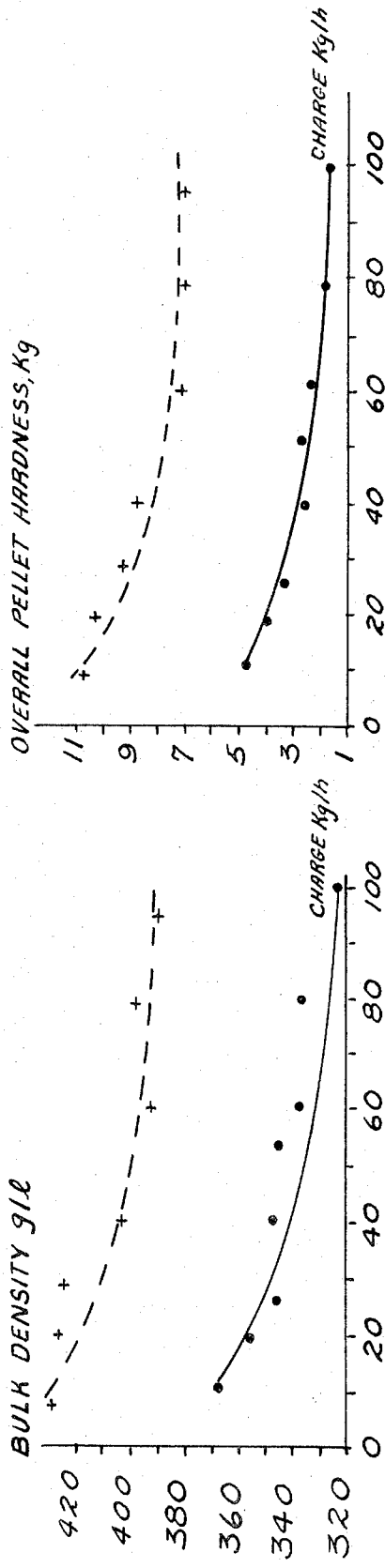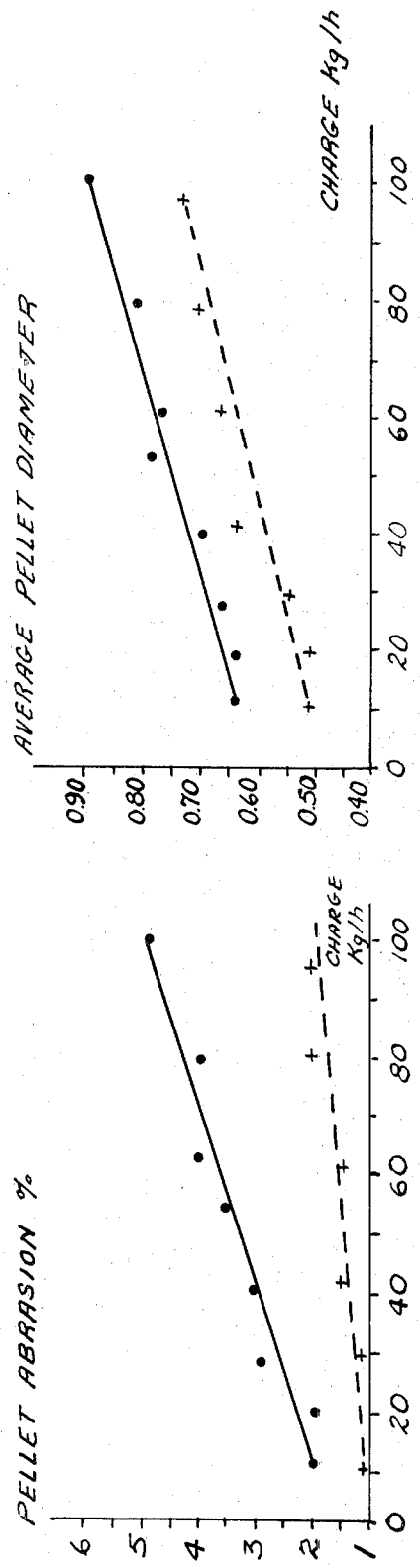
Fig. 3.
HORIZONTAL. ———
VERTICAL + – – –

PROCESS FOR THE PRODUCTION OF CARBON BLACK BEADS

The invention is concerned with an improved process for the production of carbon black pellets.

It is known to convert powdered carbon black into free flowing pellets. These free flowing pellets are necessary in order to economically handle carbon black in the automatic dosing plants of the rubber, synthetic rubber and paint industries. The pelletizing of the carbon black also has the purpose of compacting the powdered material. While powdered carbon black has a low bulk density and occupies a large volume, the pelleted carbon black made therefrom has a substantially higher bulk density and a smaller volume. This fact is of great significance in the shipment of carbon black. There are a number of known processes for the pelletization of carbon black. Of these processes the dry pelletization process and the wet pelletization process are of especial significance. In wet pelletization the carbon black is mixed with the pelletizing liquid, usually water, in such a manner that wet pellets are formed which subsequently are dried again. High bulk density and good pellet strength are desired for transportation purposes. Therefore there have not lacked endeavors to improve the apparatus for carrying out the wet pelletization in such a manner that there is attained the highest possible bulk density and favorable pellet strength. +) This is especially necessary for blacks with low particle size and high structure which tend to give low bulk densities and weak pellets. In German Auslegeschrift No. 1,264,412 and Great Britain Pat. No. 847,697 there are described arrangements which consist of cylindrical, horizontally arranged housings in which there are rotated shafts fitted with spirally arranged pins. The carbon black and the pelletizing water are supplied on one side of the housing while the wet pellets produced are ejected from the other side. Frequently several of these horizontally arranged pelletizing apparatuses are connected in succession.

Surprisingly it has now been found that an optimum in the producible bulk density and the pellet properties cannot be attained by using the horizontal method of operation. Considerably more favorable pellet properties can be obtained by the invention by operating vertically in which process the carbon black and the liquid additives are fed and pelletized contrary to the force of gravity. The present invention, therefore is concerned with a process for the production of wet pelletized carbon black of higher bulk density and good pellet properties as well as requiring less pelletizing liquid by employing a pinned screw (or shaft) provided pelletizing apparatus. The process is characterized in that the carbon black-water (or other liquid) mixture is led from below upwardly through a pelletizing apparatus provided with a substantially vertical pin containing screw or shaft. Thus, using the process highly structured fluffy carbon blacks of the ISAF and N 339 type can be transformed into pellets having a pour density of 380 to 508 grams per liter. The amount of water needed for carrying out the process with these highly structured carbon blacks can be 40 to 50 weight percent based on the total weight of carbon black and water.

It is within the invention to employ several pinned shafts operating suitably in succession in the vertical apparatus or to operate several pin containing screws intermeshingly in a passage, wherein each passage is traversed from the bottom upwardly by the carbon black-water mixture.

It is not necessary that the pelletizing apparatus be arranged exactly vertical. In many cases it is more suitable for the pelletizing apparatus to be arranged at an angle between the vertical and the horizontal, e.g., at an angle as low as 20° from the horizontal.

The invention will be understood best in connection with the drawings wherein:

FIG. 3 is a series of graphs comparing properties of the pellets made by horizontal and vertical arrangement of the apparatus.

In the drawings like numbers indicate like parts.

Figure 1:
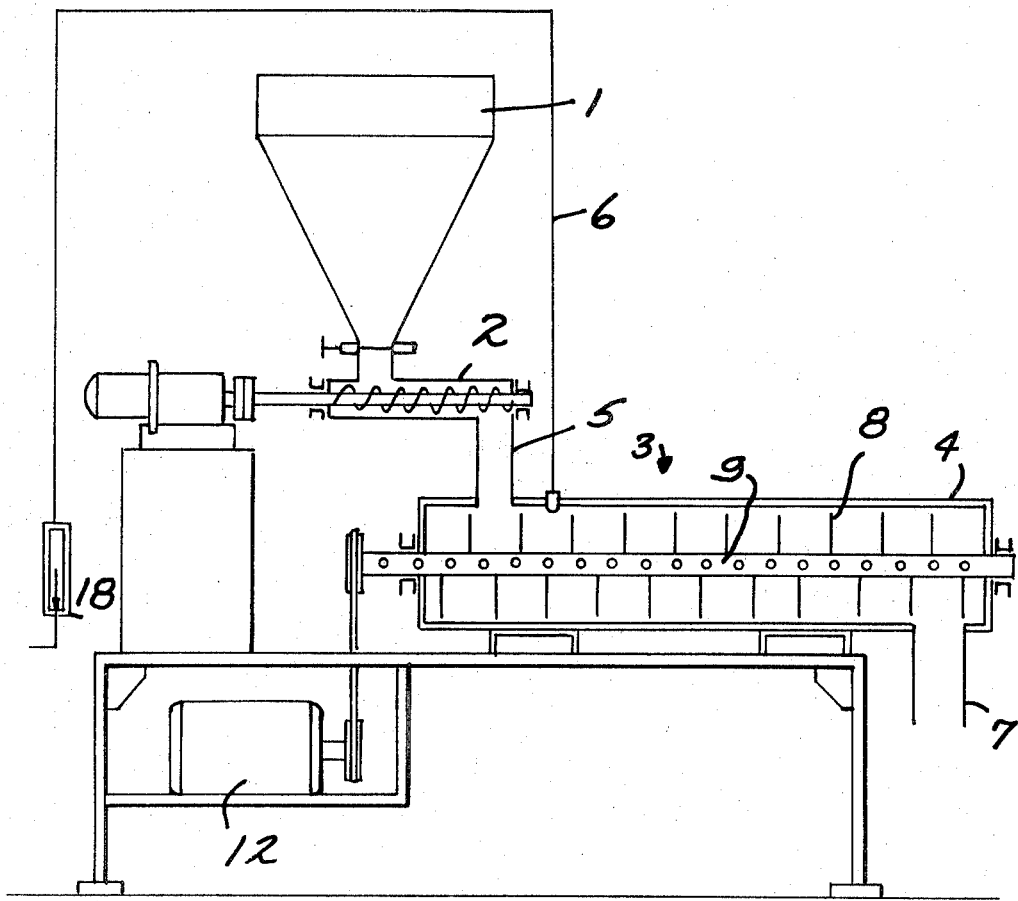
FIG. 1 shows a conventionally arranged pin containing shaft or screw pelletizing machine.

Unless otherwise all parts and percentages are by weight.

In examples 1–4 there was used as the finely divided fluffy furnace black Printex 60 (trademark), an ISAF type with relatively high structure. This carbon black has the following analytical properties:

| | |
|---|---|
| BET surface area | 120 m²/g |
| mean primary particle size determined electronoptically | 21 m μ |
| pH value | 9 |
| ash | 0.14 % |
| extractible constituents | 0.04 % |
| volatile matter | 2 % |

Unless otherwise indicated all parts and percentages are by weight.

EXAMPLE 1

Carbon black was pelletized with water without the addition of further pelleting aides as pellet binding agents. The pelletizing took place in a customary horizontally operating pelletizing apparatus according to FIG. 1. Thus carbon black from a hopper 1 (carbon black bunker) was fed to a feed screw 2 which conveyed the powdered carbon black into the powder inlet 5 of a screw-pelletizing apparatus 3 having pins attached to the screw. This apparatus is provided with a cyclindrical, horizontally mounted housing 4 having a powder inlet 5, a pelletizing liquid supply 6 and an outlet 7 for the pelletized material. Inside the housing there is rotatably mounted a shaft 9 driven by motor 12 and spiked around 90° with radial pins. The shaft moves the material being formed into pellets and gradually feeds it to the outlet 7. The amount of pelletizing liquid is regulated by a rotameter flow measurer 18.

The pelletizing apparatus had the following characteristics:

Total length 1,600 mm.
Effective length from the pelletizing liquid inlet to the carbon black outlet 1,270 mm.
Diameter 200 mm.
Pin interval from the center of one pin to the center of the next pin 20 mm.

Pin diameter 13 mm.
Distance of the pins from the wall 5 mm.
90° change of the directly neighboring pins.

Figure 2:
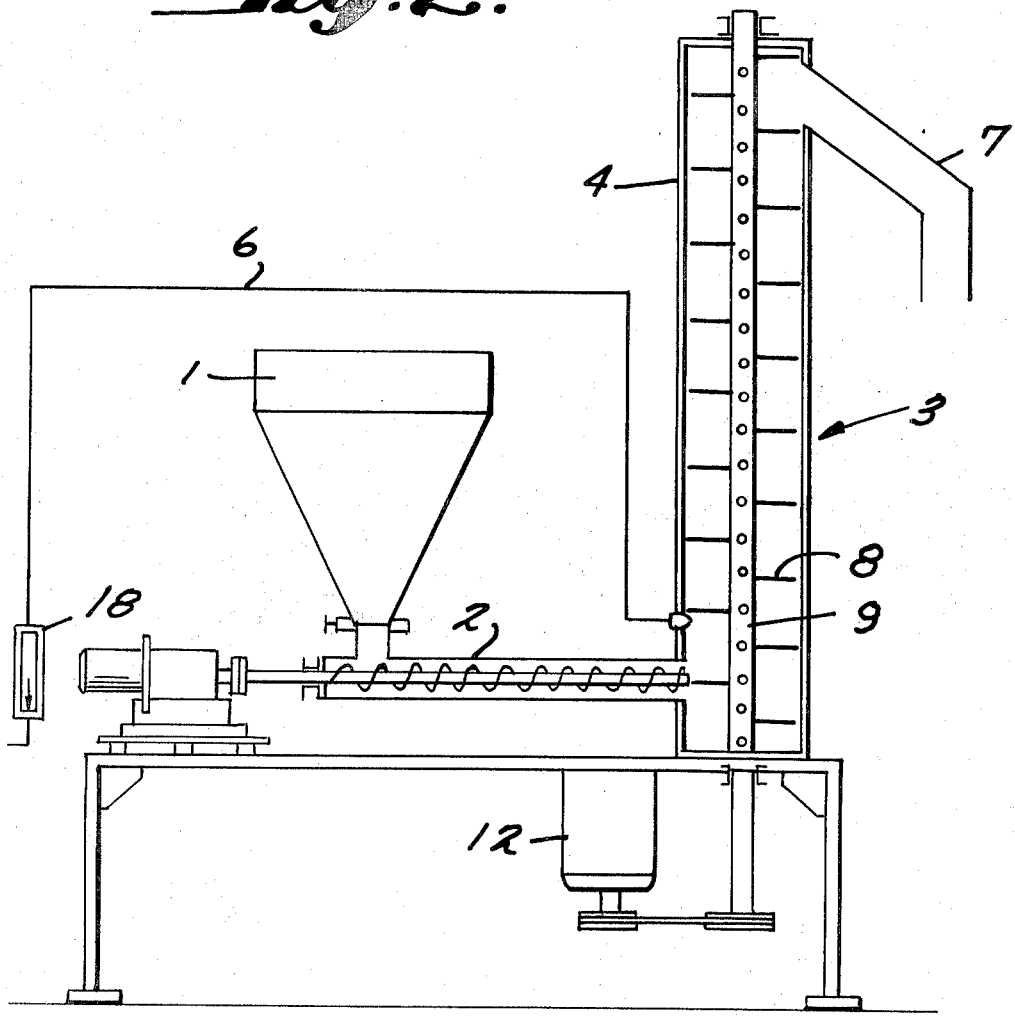
FIG. 2 illustrates a pin containing shaft or screw pelletizing machine according to the invention.
Figure 4:
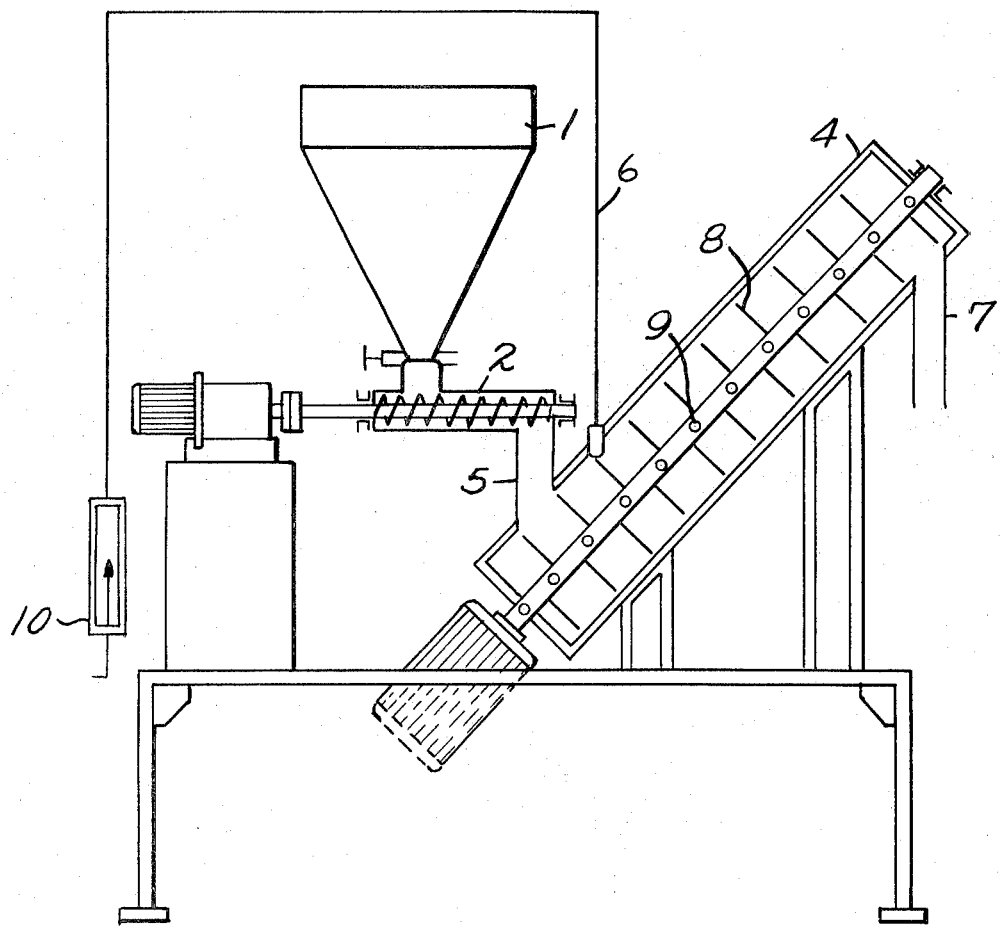
FIG. 4 is a view similar to FIG. 2 but wherein the housing is at an angle of 45° to the horizontal in accordance with Example 3.

In a further experiment this same pellitizing apparatus was arranged according to the invention so that the pellet trough stood vertically. As can be seen from FIG. 2 of the drawing, the apparatus of the invention comprises an elongated cylindrical housing having a longitudinal axis on which a centrally positioned pin shaft rotates. The carbon black inlet was in the lower part of the apparatus and the carbon black outlet was in the upper part as shown in FIG. 2. Both apparatuses were operated at a shaft speed of 800 revolutions/min. while various carbon black throughputs were employed. The water additions were always so regulated that good pellets were noted as they left the machine. After the wet pelletization the carbon black pellets were dried at 150°C. The results of the measurements carried out on the carbon black pellets are set forth in the following Table 1 and in FIG. 3. In the table experiments H1 – H8 were carried out in the horizontally arranged apparatus and experiments V1 – V7 in the vertically arranged apparatus.

From the table it can be clearly recognized that at equal carbon black charges, smaller additions of water are required with the vertical pelletizing apparatus, higher bulk densities are obtained, smaller pellets are formed and lower DBP (dibutyl phthalate) absorptions are produced. In addition to these great advantages the pellets also have a better quality. This is evident from the higher pellet strength and smaller pellet abrasion.

EXAMPLE 2

There was employed the same carbon black charge as in Example 1 and there were used the same pelletizing apparatuses as in Example 1 and FIGS. 1 and 2. Each pelletizing apparatus shaft was again rotated at 800 revolutions per minute. There were charged 20 kg/h of Printex 60. Experiments HW 1 - HW 9 were carried out by the horizontally positioned trough. In contrast experiments VW 1 – VW 9 were carried out by the vertical procedure. In contrast to the procedure of example 1 there were changed the amounts of water injected while utilizing constant charges of carbon black in order to ascertain the optimum water content of the carbon black pellets. The test results on the wet pellets dried under identical conditions are taken from the following Table 2.

Comparison Between Horizontal and Vertical
Wet Pelletization of Printex 60 with a Continuous
Introduction of 10–100 kg/h and 800 revolutions/min.
of a Rotatable Pin Shaft.

H = horizontal          V = vertical

Table 1

| Experiment | Carbon Black Charge kg/h | Moisture Content % | Pour Bulk Density g/l | Pellet Strength kg | Pellet Abrasion % | Average Pellet Size mm | DBP Absorption ml/g |
|---|---|---|---|---|---|---|---|
| H 1 | 12 | 52 | 368 | 4.8 | 2.0 | 0.64 | 1.16 |
| H 2 | 19 | 54 | 356 | 4.0 | 2.0 | 0.64 | 1.17 |
| H 3 | 26 | 54 | 348 | 3.4 | 3.0 | 0.66 | 1.18 |
| H 4 | 40 | 54 | 348 | 2.7 | 3.0 | 0.70 | 1.17 |
| H 5 | 54 | 54 | 348 | 2.7 | 3.5 | 0.78 | 1.17 |
| H 6 | 62 | 54 | 336 | 2.4 | 4.0 | 0.76 | 1.19 |
| H 7 | 79 | 54 | 336 | 1.8 | 4.0 | 0.82 | 1.19 |
| H 8 | 100 | 54 | 322 | 1.8 | 5.0 | 0.88 | 1.18 |
| V 1 | 10 | 48 | 428 | 10.6 | 1.0 | 0.52 | 0.98 |
| V 2 | 19 | 49 | 428 | 10.4 | 1.0 | 0.52 | 1.02 |
| V 3 | 28 | 49 | 424 | 9.4 | 1.0 | 0.55 | 1.06 |
| V 4 | 40 | 49 | 404 | 8.8 | 1.5 | 0.64 | 1.09 |
| V 5 | 60 | 50 | 392 | 7.0 | 1.5 | 0.66 | 1.10 |
| V 6 | 78 | 49 | 400 | 7.1 | 2.0 | 0.70 | 1.11 |
| V 7 | 95 | 50 | 390 | 7.0 | 2.0 | 0.72 | 1.12 |

Comparison Between Horizontal and Vertical Wet
Pelletization of Printex 60 With Different Amounts
of Pelletizing Water; Continuous Introduction of
20 kg/h Printex 60, 800 Revolutions per Minute.

HW = horizontal          VW = vertical

Table 2

| Experiment | Moisture Content % | Bulk Density g/l | Pellet Strength kg | Pellet Abrasion % | Average particle size mm | DBP Absorption ml/g |
|---|---|---|---|---|---|---|
| HW 1 | 47 | 352 | 1.3 | 21.0 | 0.44 | 1.22 |
| HW 2 | 49 | 364 | 1.3 | 12.0 | 0.46 | 1.22 |
| HW 3 | 56 | 356 | 2.8 | 12.0 | 0.55 | 1.22 |
| HW 4 | 51 | 356 | 3.9 | 6.0 | 0.60 | 1.20 |
| HW 5 | 52 | 344 | 3.2 | 4.0 | 0.68 | 1.20 |
| HW 6 | 54 | 352 | 2.8 | 4.0 | 0.74 | 1.21 |
| HW 7 | 55 | 348 | 2.4 | 4.8 | 0.76 | 1.20 |
| HW 8 | 56 | 340 | 2.4 | 5.6 | 0.80 | 1.20 |
| HW 9 | 58 | 324 | 1.6 | 6.6 | 0.84 | 1.20 |
| VW 1 | 40 | 476 | 1.3 | 20.0 | 0.40 | 0.96 |
| VW 2 | 42.4 | 424 | 2.3 | 10.0 | 0.44 | 0.98 |
| VW 3 | 44.5 | 404 | 6.4 | 4.5 | 0.49 | 1.03 |

Comparison Between Horizontal and Vertical Wet
Pelletization of Printex 60 With Different Amounts
of Pelletizing Water; Continuous Introduction of
20 kg/h Printex 60, 800 Revolutions per Minute.

HW = horizontal    VW = vertical

Table 2

| Experiment | Moisture Content % | Bulk Density g/l | Pellet Strength kg | Pellet Abrasion % | Average particle size mm | DBP Absorption ml/g |
|---|---|---|---|---|---|---|
| VW 4 | 46 | 410 | 11.3 | 2.0 | 0.52 | 1.10 |
| VW 5 | 47 | 412 | 10.8 | 1.0 | 0.54 | 1.07 |
| VW 6 | 48.4 | 410 | 8.8 | 1.5 | 0.58 | 1.06 |
| VW 7 | 50 | 404 | 5.8 | 2.0 | 0.66 | 1.06 |
| VW 8 | 51.5 | 392 | 4.2 | 2.0 | 0.70 | 1.08 |
| VW 9 | 53.8 | 388 | 3.8 | 3.0 | 0.72 | 1.09 |

It can be clearly recognized that in the horizontal pelletization optimum properties are at about 52 percent water. When vertical pelletization is employed optimum properties are reached at 46 percent water. Thus there is a clear advantage in using a vertical pelletizing apparatus because there is a lower heat energy requirement in the subsequent drying. The pellet strength (11.3 kg against 3.9 kg) and the pellet abrasion at the optimum also are considerably better for the vertical pelletizing apparatus. The comparison of bulk density at the optimum likewise is entirely in favor of vertical pelletization (410 g/l against 356 g/l).

EXAMPLE 3

The same apparatus are used in Example 1 was used again. In Example 1 the pin shaft had exactly horizontal position (0° angle) or exactly vertical position (90° angle). To study the consequence of angles lower than 90° and higher than 0° angle, we examined a position of 45°. The machine was exactly the same as in Example 1 except for small alterations for a convenient inlet of the fluffy carbon black. The results were compared with the trough positioned at angles of 0° and 90°.

20 kg Printex 60/hour
800 rpm pin shaft velocity

|  | 0° | 45° | 90° |
|---|---|---|---|
| Moisture content % | 54 | 50 | 49 |
| Pour density g/l | 356 | 410 | 428 |
| Pellet Strength kg | 4.0 | 9.4 | 10.4 |

40 kg Printex 60/hour
800 rpm shaft velocity

|  | 0° | 45° | 90° |
|---|---|---|---|
| Moisture content % | 54 | 50 | 49 |
| Pour density g/l | 348 | 380 | 404 |
| Pellet Strength kg | 2.7 | 7.0 | 8.8 |

It may be noted that no exactly vertical position is necessary to demonstrate the effectiveness of the invention. Angles with a substantial vertical component show clear improvements over the exactly horizontal position. Nevertheless, the vertical position gives the highest improvement as expected.

EXAMPLE 4

To demonstrate the outstanding effects of machines according to the invention an experiment was carried out in Example 4 with 1,600 rpm. The same machine as described in Example 1 was used in vertical position.

| Carbon black charge kg/h | Moisture content % | Pour Density g/l | Pellet strength kg | Pellet abrasion % | Average pellet size mm |
|---|---|---|---|---|---|
| 15 | 46 | 508 | > 14 | 0.5 | 0.66 |
| 28 | 46 | 488 | > 14 | 0.5 | 0.70 |

From this example the conclusion can be drawn that Printex 60, an ISAF-Type black of comparatively high structure, can be pelleted down to a pour density of 508 grams/liter compared with 340 – 350 grams/liter with a normal commercial carbon black product.

EXAMPLE 5

In this Example instead of Printex 60 (ISAF) another type of carbon black was used. The black used was N 339 fluffy type a highly-structured black. In a well known conventional technical pelletizer 53 percent moisture was necessary and usual commercial pour densities of 350 g/l with DBP-values of 1.22 ml/g were reached. The vertical pelletizer was able to achieve better results:

| rpm | Carbon black load kg/h | Moisture content % | Pour density g/l | DBP-absorption ml/g |
|---|---|---|---|---|
| 1500 | 18 | 43 | 436 | 0.98 |
| 1500 | 30 | 44 | 408 | 1.02 |
| 1500 | 40 | 46 | 400 | 1.02 |

Thus Example 5 shows that the favourable effect of machines positioned according to the invention is independent of the type of black and that even very highly structured blacks can be compacted to high pour densities. The visual appearance of the pellets makes clear the advantages of a vertically positioned pelletizer. Wet pellets so produced are smaller and rounder than the corresponding pellets made by a horizontally positioned pelletizer. Besides pellets made by a vertically positioned pelletizer have great uniformity in pellet size. By pelletization with the pelletizer in the vertical position and in which the carbon black moves upwardly there is unexpectedly obtained a decided improvement in the wet pelletization process. This improvement includes an observably smaller use of pelletizing liquid and the product of mechanically stronger pellet qualities in comparison to the same carbon black employed in the horizontally positioned pelletizer. The range of use of the invention is not limited to the forms of the pelletization apparatus described in the examples. In Examples 1–5 highly structured blacks with fine particle size are used which tend to give extremely low bulk densities. It is obvious, that during pelletizing of low structure blacks or coarser blacks higher densifications are reached than those given in the examples. The thought of the invention is that in these cases as well the vertical operation gives higher densification than in horizontal operation.

It may be observed further, that by the addition of pellet binders like sugar, molasses, pentaerythritol, lignosulfonates a considerable additional increase of pour density is reached and DBP is decreased. We did not use pellet binders to evaluate clearly the effect of the apparatus according to the invention. Instead of pure water it is as possible to use water with additions of different pellet binders as sugar, molasses, lignosulfonates, pentaerythritol.

In place of water there can be used other pelletizing liquids such as alcohols, ketones, petrol fractions or mineral oils and halogen compounds without and with additions of pellet binders. Finally mixtures of water and the aforementioned products may be applied.

Instead of the described single passage pelletization apparatus there can also be used several vertically operating pinned-shaft passages inserted in succession. Also there can be used in the invention vertically operating pellet machines in which several pinned-shafts operate intermeshingly in a passage.

The construction of the described pinned-shafts also should not limit the range of use of the new pelletizing process. Thus in place of the pins placed at around 90°, for example there can also be employed inserted pins in screw form with lesser or larger pin intervals than described in the examples. Furthermore the thought of the invention is not limited to pelletization taking place exclusively in an exactly vertical pelletization apparatus. In the sense of the invention a vertically effective force component is important if the pelletizing machine has a lower angle to the horizontal, e..g., more than 20°, though the maximum effect is reached in the vertical position.

What is claimed is:

1. In a process for wet pelletizing carbon black in a pelletizing apparatus comprising an elongated cylindrical housing having a longitudinal axis on which a centrally positioned pin shaft rotates, the improvement comprising:
   a. introducing carbon black and a pelletizing liquid into a lower inlet of said pelletizer having said longitudinal axis substantially vertically positioned;
   b. rotating said pin shaft to move said carbon black and liquid vertically upwardly through said pelletizer while forming carbon black pellets therein; and
   c. removing from an upper exit of said pelletizer, carbon black pellets having a higher bulk density, increased strength, increased abrasion resistance and requiring less pelletizing liquid than when said carbon black and pelletizing liquid are so treated in a conventional horizontally positioned pelletizer.

2. The process according to claim 1 wherein said pelletizing liquid is water.

3. The process according to claim 1, wherein said pelletizer axis is positioned 90° to the horizontal.

4. The process of claim 1, wherein said pelletizer axis is positioned at an angle of between 20° and 90° to the horizontal.

* * * * *